Figure 1:
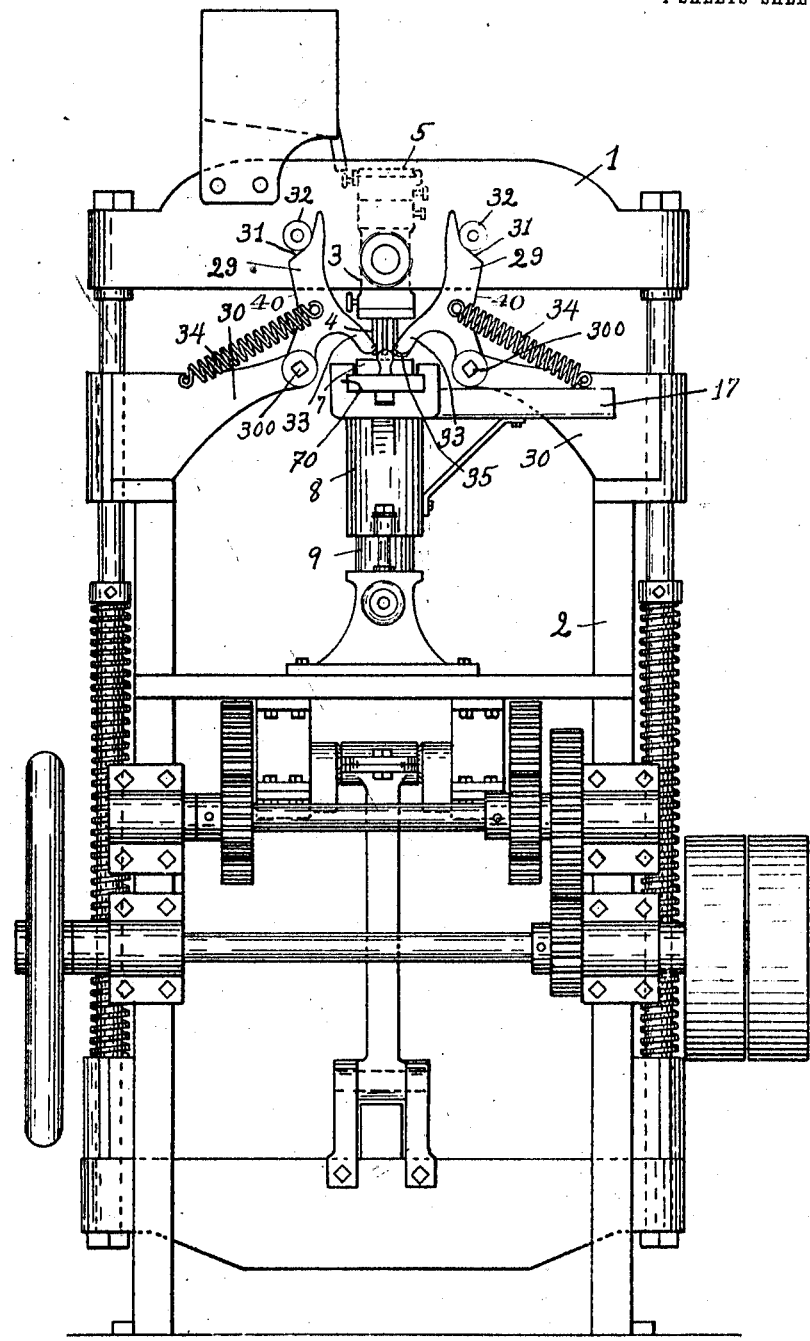

C. R. TOWLE.
HEEL NAILING MACHINE.
APPLICATION FILED OCT. 3, 1904.
982,550.
Patented Jan. 24, 1911.
4 SHEETS—SHEET 2.
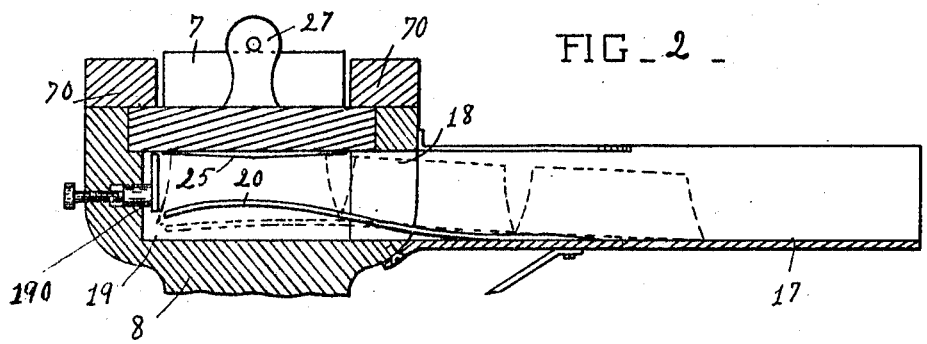
FIG_2_
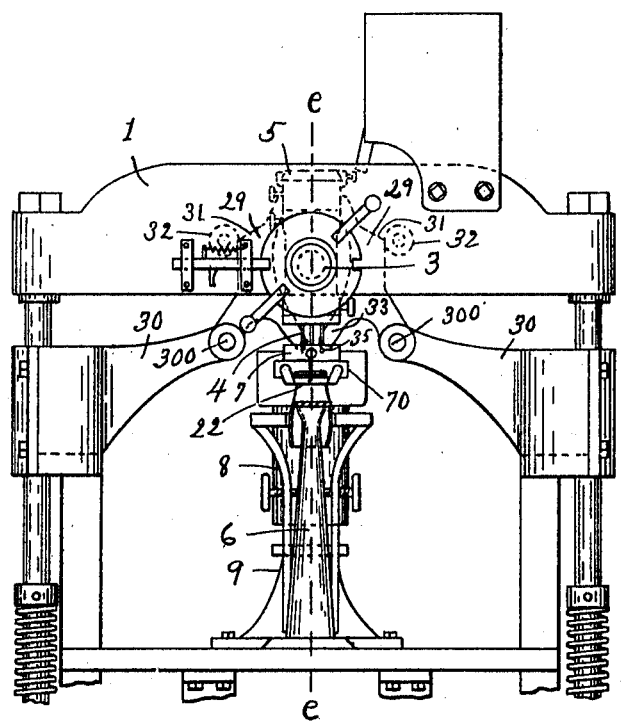
FIG_3_
Witnesses:
H. B. Davis
Maud M. Piper
Inventor:
Chas. R. Towle
by Royal Hamman
Attys

C. R. TOWLE.
HEEL NAILING MACHINE.
APPLICATION FILED OCT. 3, 1904.

982,550.

Patented Jan. 24, 1911.

4 SHEETS—SHEET 3.

Witnesses:
H. B. Davis.
Maud M. Piper.

Inventor:
Chas. R. Towle

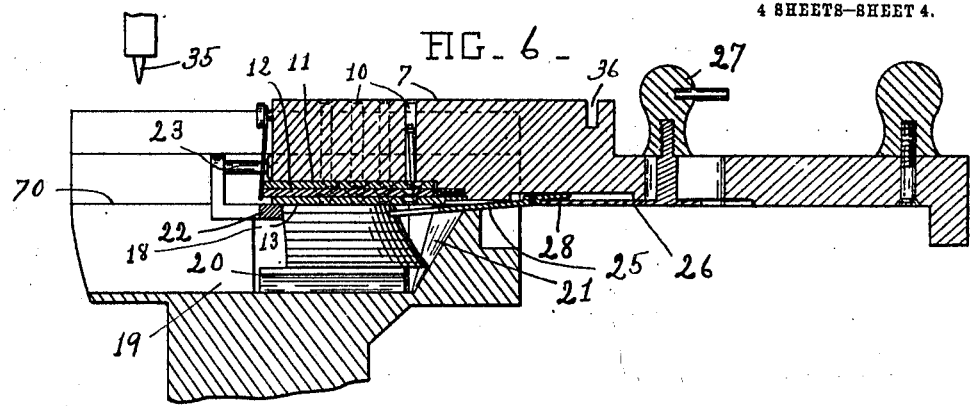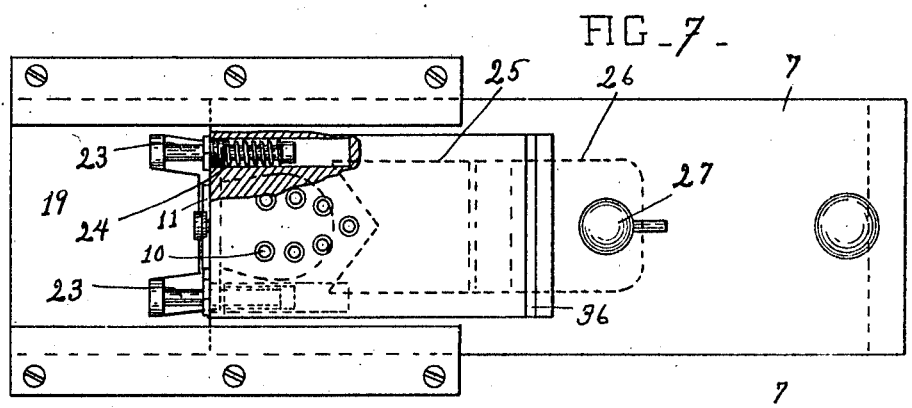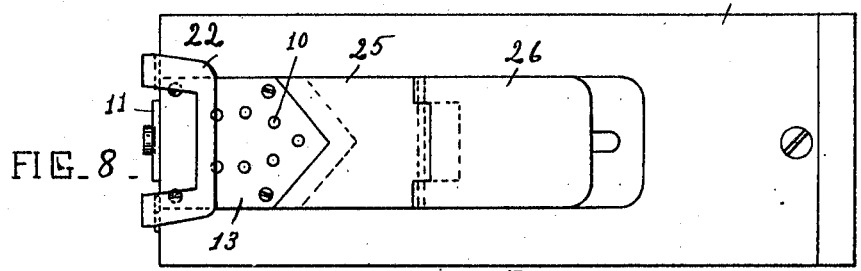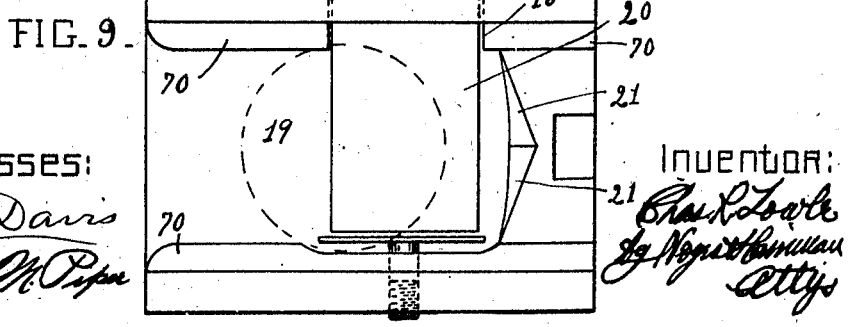

UNITED STATES PATENT OFFICE.

CHARLES R. TOWLE, OF HAVERHILL, MASSACHUSETTS, ASSIGNOR, BY DIRECT AND MESNE ASSIGNMENTS, TO UNITED SHOE MACHINERY COMPANY, OF PATERSON, NEW JERSEY, A CORPORATION OF NEW JERSEY.

HEEL-NAILING MACHINE.

982,550.

Specification of Letters Patent. Patented Jan. 24, 1911.

Application filed October 3, 1904. Serial No. 226,961.

*To all whom it may concern:*

Be it known that I, CHARLES R. TOWLE, of Haverhill, county of Essex, and State of Massachusetts, have invented an Improvement in Heel-Nailing Machines, of which the following description, in connection with the accompanying drawings, is a specification, like characters on the drawings representing like parts.
This invention relates to heel nailing machines.

The invention is shown and described herein as embodied in a machine of the class in which is employed a vertically movable cross head carrying a turret upon which the driver gang and spanker are mounted. While some features of the invention are more particularly for use in connection with a machine of this class, other features are capable of more general application—for example, to machines not employing a turret. It will be understood, therefore, that the invention hereinafter described is not to be limited to machines of the former class except where the terms employed are such that no other interpretation is possible.

The invention will be described with particular reference to its application to a machine of the class employing a turret. In operating machines of this character it has been customary for the operator to place the heel in position on the heel seat of the shoe by hand and then to clamp the nail holding plate upon the heel to hold the same in place until the drivers advance and force the nails in the plate through the heel into the shoe, the clamping movement of the plate being produced by a manually actuated device or in some cases by a treadle and intermediate connections. In securing heels in this manner the heel is often inaccurately positioned upon the heel seat by the operator. Moreover, after it has been placed in position it is often moved somewhat while it is being clamped or nailed. Where glue or cement is placed between the heel and heel seat the liability of slipping and displacement of the heel is increased. Furthermore, the action of driving the nails through the heel has a considerable tendency to move it upon the heel seat. Such movement is disadvantageous not only because it causes the heel to be positioned improperly upon the heel seat, but also because it may cause the nails to be distorted or crippled while being driven, so that the heel is not securely attached.

My invention is concerned more particularly with the production of a machine in which difficulties of the nature above mentioned are avoided. In the present embodiment of the invention I provide means for positioning a heel in proper position with relation to the heel seat of a shoe, the arrangement being such that it is unnecessary for the operator to position the heel manually upon the shoe. A convenient construction is that shown which comprises a carrier movable toward and from the nail driving mechanism and provided with means for clamping a heel. The carrier is supplied with a heel while in a position removed from the nail driving mechanism. Preferably a guideway is provided which is constructed to support a series of heels and to guide them into the path of the carrier. The arrangement is such that the clamp is opened to receive the heel when the carrier is retracted from the nail-driving mechanism and is closed in the reverse movement. The guideway in the machine shown is constructed to support the heels edge to edge in an approximately horizontal row, the heels being advanced in the guideway by hand at the proper time.

Another important feature of my invention relates to means for automatically clamping the heel firmly upon the heel seat of the shoe, said means being constructed to hold the heel so securely that it cannot be moved during the nailing operation.

To this end, an important feature of the invention consists in the provision of means, actuated by the movement of the cross-head, for moving a work-engaging member, such as the nail plate, toward the jack to subject a heel to pressure preliminarily to the operation of the drivers. In the machine herein illustrated, the work-engaging member is moved through a cam lever, or levers, actuated by the initial movement of the cross-head to apply the full pressure to the heel and then is locked in position with the heel under pressure during the subsequent attaching operation.

Other features of the invention will be hereinafter described and pointed out in the claims.

Figure 4:
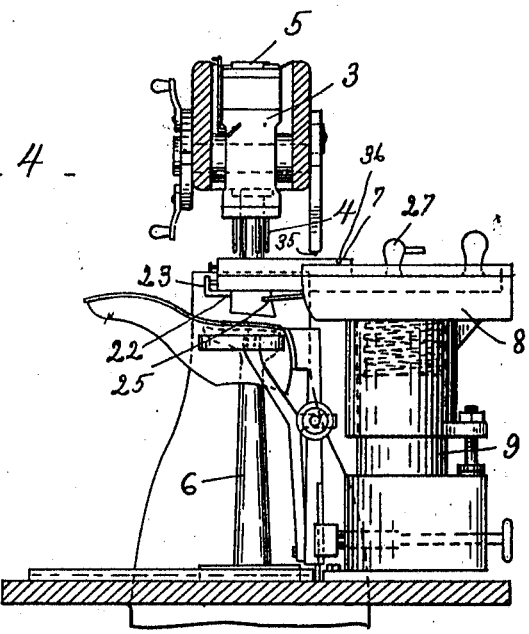
Figure 5:
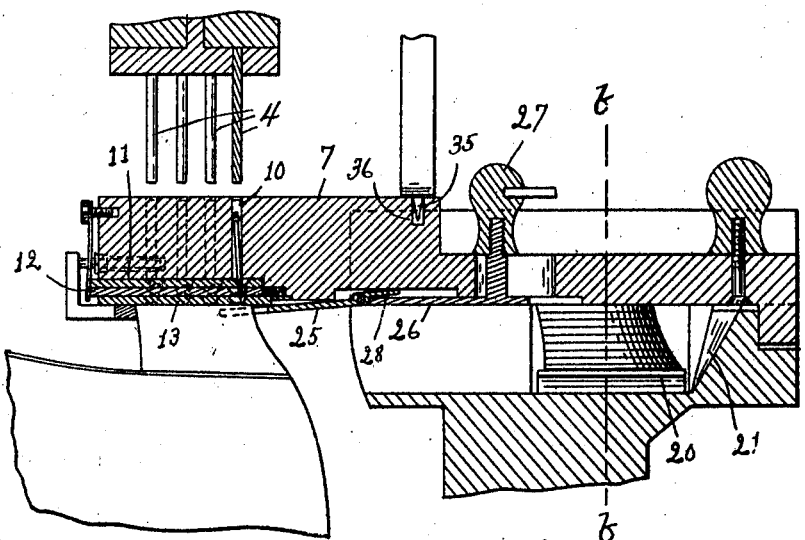

In the drawings, Figure 1 shows, in elevation, the rear side of a heeling machine provided with my invention. Fig. 2 is a detail cross section on the line b—b of Fig. 5. Fig. 3 is a front elevation of the main operating parts of the machine. Fig. 4 is a side elevation thereof partly in section. Figs. 5 and 6 are enlarged sectional detail views taken on the line e—e of Fig. 3, showing the parts in different positions. Figs. 7 and 8 are respectively top and bottom plan views of the nail and heel carrier, and, Fig. 9 is a plan view of the carrier supporting head.

The machine illustrated in Fig. 1 is in many respects identical with a well-known type of heeling machine employing a vertically movable cross head 1 which is reciprocally mounted in the usual manner on the frame 2 of the machine, and is driven by a suitable power mechanism which need not be specifically described, as such mechanism is well known in the art. The usual turret 3 is mounted in the cross head 1 and is provided with the usual driver block, having a gang of drivers 4, and a top lift holder and spanker 5. The jack 6 is mounted upon the bed of the machine in a position to hold the shoe bottom side up, as illustrated in Fig. 4, and the usual shoe centering means are provided at each side of and in the rear of the jack. The nail holding plate or carrier 7 is slidably mounted in ways 70 formed on the head 8, which is in turn supported on a column 9, the latter being mounted upon the bed of the machine, and said head being adapted to move vertically upon said column, and being yieldingly supported by a spring, indicated in dotted lines in Fig. 4, which normally holds said head up against a suitable stop. The holder carrier 7 is provided with a series of nail holes 10 which are arranged correspondingly to the drivers 4, and are of such a diameter as to permit said drivers to pass freely therethrough. A pair of nail guiding and supporting plates 11 and 12 are supported above the face plate 13, the latter being provided with a series of nail holes which register with the holes 10 of carrier 7. A trough or guide way 17, which is shown as arranged in a nearly horizontal position, although it may be inclined with equal advantage, is secured to one side of the head 8, in register with an opening 18 which leads into chamber 19 formed in the upper side of the head directly beneath carrier 7, and a spring 20 is secured at one end to the bottom of said trough 17, and extends longitudinally therein upwardly into said chamber 19, as best illustrated in Figs. 2, 5 and 9, so that when a number of heels are placed in said trough and pushed toward the head the foremost heel will be pressed firmly against the under side of the carrier by the spring 20, as shown in Fig. 5. An adjustable stop plate 190 is provided adjacent the end of said spring 20, said plate being adjusted to stop the heel near the center of the carrier. The rear end of the wall of chamber 19 comprises two rearwardly inclined, obliquely disposed abutments 21, the faces of which meet in a line of intersection which is in the central vertical plane of the jack, as shown in Fig. 9. A heel clamping bar or breast gage 22 is held close to the under side of the carrier near the front end thereof, by means of a pair of rods 23, which are reciprocally mounted in chambers formed in the front end of the carrier, springs 24 being provided for drawing said bar rearwardly, and the supporting arms of said bar acting as stops for limiting the rearward movement thereof. A holding latch or back gage 25 is pivotally connected at its rear end to the front end of a plate 26, which is slidably mounted in the under side of the carrier, and adjustably connected thereto by a clamping nut 27. A stop arm 28 is connected to the rear end of latch 25, and acts to hold the same in the slightly inclined position illustrated in Figs. 5 and 6. The front end of said latch is provided with a V-shaped centering notch, as shown in Fig. 8, the apex of said notch lying in the vertical plane of the line of intersection of the faces of abutments 21.

A pair of oppositely disposed cam dogs 29 are pivoted at 300 to stationary brackets 30, mounted on the frame of the machine, said dogs each having an inclined upper end portion, or cam 31 in position to be engaged by rolls 32 journaled on the cross head 1. Said dogs are also provided with arms 33 in position to engage the upper side of the carrier 7, when they are swung toward each other upon their pivots. Springs 34 are connected to said dogs, and act to swing them away from each other to lift said arms 33 from the carrier. One of the arms 33 is provided in its end with a knife edge 35, see Figs. 1 and 5, which is adapted to enter a recess 36 in the upper side of the carrier, and to center the front end of the latter over the heel of the jack.

The operation of the above described machine is as follows: The operator's assistant, who stands at the back of the machine, places a number of heels in the guide-way 17 with the breast side facing the front of the machine, as indicated in Fig. 2, and, while the carrier 7 is in its forward position, pushes the foremost heel into the chamber 19, so that it is held in the rear position illustrated in Fig. 5. When the cross head is raised, after the heel nails have been driven, the assistant draws back the carrier 7, and the latter slides over the top of the heel in the rear of the chamber 19, the latch or back gage 25 being lifted up by the heel and drawn over its upper side until the breast gage 22 engages the breast of the heel, and then the heel is drawn back with the carrier until its rear side is pressed against the inclined abutments 21, and the springs 24 are compressed, the rods 23 being drawn out, as shown in Fig. 7. The inclined abutments 21 will act to center the heel perfectly with relation to the jack, and, as the faces thereof are rearwardly inclined, the heel will be forced firmly up against the under side of the face plate 13, as illustrated in Fig. 6, notwithstanding the fact that the only portion of the heel which bears against said abutments 21 is at its then lower corner, which is below the level of the point at which the bar 22 engages its breast.

When the plates have reached this position the latch 25 will have dropped down to the inclined position of Fig. 6, with its forked or notched end a short distance from the rear side of the heel, see dotted position of Fig. 7, so that when the carrier is pushed forward again the springs of bar 22 will continue to hold the heel back against abutments 21 until it is engaged by latch 25, in its V-shaped notch, and, as the springs 24 will still be under tension, the heel will be firmly pressed into the notch of said latch, which thereby becomes the stationary member of a heel holding clamp. The heel will also be held against the under side of plate 13, as illustrated in Fig. 4, said slide 26 previously having been adjusted so that the heel will be held in the desired relation to the nail holes of said plate. When the carrier is again pushed forward to its limit the heel will be carried to the correct position over the heel seat of the shoe, on the jack. The nail holes 10 having previously been supplied with nails, and a shoe having previously been placed upon the jack by the operator, the operator depresses the treadle, causing the head to be drawn down, the turret then being in the position illustrated in Figs. 1, 3 and 4, with the driver gang in alinement with the holes 10 of the carrier. As the cross head moves downwardly the rolls 32 bear against the cam faces 31 on the dogs 29, causing them to be swung toward each other, and pressing their fingers 33 down upon the upper side of the carrier, depressing head 8, and pressing the heel, held by the carrier, upon the heel seat. If the carrier should happen to be slightly misplaced it will be moved to the proper position by the knife edge 35 as it enters recess 36. By the time the heel has been pressed firmly on the heel seat the dogs 29 will have been swung together to such an extent that their straight sides 40 will be vertical and the rolls 30 will have passed from the faces 31 to said sides 40, so that during further downward movement of the cross head the pressure of the dogs on the carrier will not be increased. This pressure is, however, much greater than what would be secured by the operator in clamping the heel by hand, and is sufficient to hold the heel in place so firmly that all possibility of its being displaced by the action of driving the nails therethrough is avoided. It will be observed in this connection that the heel is held from horizontal movement by the rigidly held latch 25, and bar 22, not only while it is being pressed on the heel seat, but also while the nails are being driven. The movement of the drivers is so timed that they do not engage the heads of the nails until after the heel has been firmly pressed upon the heel seat of the shoe, and, while the heel is thus held, the drivers force the nails through the heel against the jack, clenching their ends in the usual manner. When the cross head is again lifted the carrier is lifted from the heel which has been attached by the spring of head 8, so that the operator's assistant may draw back the carrier in the manner before described. After the heel has been attached the top lift is spanked onto the heel in the usual manner, and the operation of attaching the heel is completed.

It will be seen that the guideway 17 and the carrier which coöperates with it, afford a convenient and effective means for supplying the heels to attaching position.

In heel attaching machines now in general use the heels are necessarily supplied singly to the machine and inserted by hand in the positioning clamps before the machine is started. In the present invention the heels may be supplied to the guideway 17 whenever convenient, and the operation of inserting a heel in the carrier is accomplished by advancing by hand the line of heels in the guideway and retracting the carrier, it being unnecessary for the operator or his assistant to touch the heel which moves into the path of the carrier, or to manipulate the clamping means upon the carrier.

Having thus described my invention, what I claim as new and desire to secure by Letters Patent is:

1. In a heel nailing machine, a vertically movable head, a driver mounted thereon, a jack, a vertically movable nail plate adapted to be held in line with the jack, and mechanism actuated by said head during the first part of its acting movement for moving vertically said plate to press a heel upon the heel seat and for holding said plate in the position to which it is moved during the latter part of its acting movement.

2. In a heel nailing machine, a vertically movable cross head, a driver gang mounted thereon, a jack, a vertically movable nail plate adapted to be held over the jack, means carried by said plate for supporting a heel against the face of said nail plate, and means, operated by said cross head as it descends, for depressing said plate in advance of the driver gang and for locking the same in a depressed position while said gang is descending, substantially as described.

3. In a heel nailing machine, a vertically movable head, a driver mounted thereon, a jack, a vertically movable nail plate adapted to be held over the jack, means carried by said plate for supporting a heel beneath it, a stationarily pivoted lever arranged to be acted upon by said head as it descends and to depress said plate to a predetermined position, the construction and arrangement being such as to permit further downward movement of said head while in engagement with said lever and while holding said plate in said position, substantially as described.

4. In a heel nailing machine, a vertically movable head, a driver mounted thereon, a jack, a vertically movable nail plate adapted to be held over the jack, means carried by said plate for supporting a heel beneath it, a stationarily pivoted lever having two faces at an angle to each other arranged to be successively acted upon by said head as it descends, and formed to cause said plate to be depressed to a predetermined position and to be locked in such position during further downward movement, substantially as described.

5. In a heel nailing machine, a supporting head having a heel chamber in its upper end, an approximately horizontal heel guide-way leading into one side of said chamber, a jack in front of said head, a carrier movable toward and from said jack, and having a nail plate adapted to be held over said jack, heel holding members supported by said carrier and disposed at opposite ends of and beneath said plate, and means for causing said members to engage a heel in said chamber, during the movement of the carrier, substantially as described.

6. In a heel nailing machine, a jack, a horizontally movable carrier having a nail plate adapted to be held over said jack, a rearwardly spring-pressed heel-clamping member supported by said carrier at the front end of said plate, and a heel holding member supported by said carrier in the rear of said plate, means for supporting a heel beneath the rear portion of said carrier when in its forward position, and for holding it from rearward movement as said clamping member is pressed against the same by rearward movement of the carrier, substantially as described.

7. In a heel nailing machine, a jack, a horizontally movable carrier having a nail plate adapted to be held over the jack, a rearwardly spring-pressed heel-clamping member supported by said carrier at the front end of said plate, and a heel-holding latch pivoted to said carrier in the rear of said plate, means for pressing a heel against the under side of said carrier when in its forward position, and means for holding the heel from rearward movement as said clamping member is pressed against the same upon a rearward movement of the carrier, substantially as described.

8. In a heel nailing machine, a jack, a horizontally movable carrier having a nail plate adapted to be held over said jack, a rearwardly spring-pressed heel-clamping member supported by said carrier at the front end of said plate, and a relatively stationary heel-holding member supported by said carrier in the rear of said plate, means for supporting a heel beneath the rear portion of said carrier when in its forward position, and a heel centering abutment for holding the heel from rearward movement as said clamping member is pressed against the same upon rearward movement of the carrier, substantially as described.

9. In a heel nailing machine, a jack, a horizontally movable carrier having a nail plate adapted to be held over said jack, a rearwardly spring-pressed heel-clamping member supported by said carrier at the front end of said plate, and a heel-holding member connected to said carrier in the rear of said plate, means for supporting a heel beneath the rear portion of said carrier when in its forward position, means for holding the heel from rearward movement, as said clamping-member is pressed against the same by rearward movement of the carrier, comprising an abutment having faces converging to the central plane of the jack, substantially as described.

10. In a heel nailing machine, a jack, a horizontally movable carrier having a nail plate adapted to be held over said jack, a rearwardly spring-pressed heel-clamping member supported by said carrier at the front end of said plate, and a heel-holding member supported by said carrier in the rear of said plate, means for supporting a heel beneath the rear portion of said carrier when in its forward position, means for holding the heel from rearward movement, as said clamping-member is pressed against the same by rearward movement of the carrier, comprising an abutment having rearwardly inclined faces converging to the central plane of the jack, substantially as described.

11. In a heel nailing machine, a jack, a horizontally movable carrier having a nail plate adapted to be held over said jack, a rearwardly spring-pressed heel-clamping bar supported by said carrier at the front end of said plate, and a forwardly extending heel-holding latch pivoted to said carrier in the rear of said plate, a guide-way for conducting the heels beneath the carrier, a spring in the bottom of said guide-way for pressing the heels against the under side of the carrier, and means for holding the heel from rearward movement as the carrier is moved rearwardly, substantially as described.

12. In a heel nailing machine, a jack, a horizontally movable carrier having a nail plate adapted to be held over said jack, a rearwardly spring-pressed heel-clamping bar supported by said carrier at the front end of said plate, a forwardly extending heel-holding latch pivotally connected to said carrier in the rear of said plate, and movable into the plane of said plate, a stop for holding said latch in an oblique position with its front end below the level of said plate, means for holding a heel against the under side of said carrier and preventing rearward movement thereof as the carrier is moved rearwardly, substantially as described.

13. In a heel nailing machine, a jack, a horizontally movable carrier having a nail plate adapted to be held over said jack, a rearwardly spring-pressed heel-clamping bar supported by said carrier at the front end of said plate, a forwardly extending heel-holding latch pivotally and adjustably connected to said carrier in the rear of said plate, means for holding a heel beneath the rear portion of said carrier when in its forward position, and means for holding the heel from rearward movement as said bar is pressed against the same upon rearward movement of the carrier, substantially as described.

14. In a heel attaching machine, the combination with mechanism for driving nails into a heel, of a carrier movable toward and from said mechanism and provided with means for clamping a heel and a guideway constructed to support a series of heels edge to edge and arranged to guide them into position to be engaged by said clamping means.

15. In a heel attaching machine, the combination, with mechanism for driving nails into a heel, of a carrier movable toward and from said mechanism and provided with means for clamping a heel, and a guideway constructed to support a series of heels edge to edge, and arranged to guide them into the path of the carrier, said clamping means being arranged to be brought into effective relation to a heel by the movement of the carrier.

16. In a heel attaching machine, the combination with mechanism for attaching a heel to a boot or shoe, and means for positioning the heel upon the boot or shoe, of a guideway for the heels constructed to support a series of heels in an approximately horizontal row, and arranged to guide the heels to said positioning means.

17. In a heel attaching machine, the combination with mechanism for driving nails into a heel, of a carrier movable toward and from said mechanism and provided with means for clamping a heel, and a guideway constructed to support a series of heels edge to edge, and arranged to guide them into the path of the carrier, and means for holding the heel while it is engaged by one clamp member to permit the other member to be moved by the carrier to open the clamp to receive the heel, substantially as described.

18. In a heel nailing machine, a vertically movable head, a driver mounted thereon, a jack, a vertically movable nail plate adapted to be held over the jack, means carried by said plate for supporting a heel beneath it, a stationarily pivoted lever having a cam face and a locking face, means on said head for engaging said cam face on its downward movement to move said lever to depress said plate to a predetermined position, and for thereafter engaging said locking face to hold the plate in said position during further downward movement, substantially as described.

19. In a heel attaching machine the combination with mechanism for driving nails into a heel, of a carrier movable toward and from said mechanism, means for guiding a heel into the path of said carrier and for restraining said heel from rearward movement with the carrier, devices sustained by said carrier for gripping the heel arranged to be opened by engagement with the heel in the rearward movement of the carrier, and means for closing said devices upon the heel in the forward movement of the carrier.

20. In a heel nailing machine the combination with mechanism for driving nails into a heel, of a carrier movable toward and from said mechanism and provided with clamping devices arranged to open longitudinally of the carrier to receive a heel and a guideway extending transversely of the path of the carrier and arranged to guide a heel into position to be gripped by said clamping devices.

21. In a heel attaching machine, the combination with mechanism for driving nails into a heel, of a carrier movable toward and from said mechanism and provided with means for clamping a heel and a guideway for supporting a series of heels with their side edges in engagement with each other, constructed to guide the heels into position to be engaged by said clamping means.

22. In a heel nailing machine, a vertically movable head, a driver mounted thereon, a jack, a vertically movable nail plate adapted to be held in line with the jack and mechanism actuated by an initial movement of the head for forcing the plate toward the jack whereby the heel is pressed into engagement with the shoe prior to the attaching operation, and means for returning said mechanism to its initial position during the return movement of the head.

23. In a heel attaching machine, the combination with attaching mechanism, of a carrier movable toward and from said mechanism and provided with means for clamping a heel thereon, and a guideway for supporting a series of heels with their side edges in engagement with each other formed to support the heels with their lifts in an approximately horizontal position and arranged to guide the heels into position to be engaged by said clamping means.

24. In a heel attaching machine, the combination with attaching mechanism, of a carrier movable toward and from said mechanism and provided with means for clamping a heel thereon, a guideway for supporting a series of heels in line with their side edges in contact with each other arranged to guide the heels into position to be engaged by said clamping means and an adjustable stop for limiting movement of the heels toward said clamping means.

25. In a heel attaching machine, the combination with attaching mechanism, of a carrier movable toward and from said mechanism and provided with means for clamping a heel, a guideway for supporting a series of heels with their side edges in contact with each other arranged to guide the heels into a position beneath the carrier in operative relation to said clamping means, and means for pressing the heels against the lower face of the carrier.

26. In a machine of the character described, a support having a heel receiving space, a guideway constructed to support a series of heels edge to edge and to conduct the heels successively into said space, and a carrier for successively removing the heels from said space.

27. In a machine of the character described, a vertically movable support having a heel receiving space, a guideway connected to said support and movable therewith, said guideway being constructed to support a series of heels edge to edge and to conduct the heels successively into said space, and a carrier for successively removing the heels from said space.

28. In a heel attaching machine, a support having a heel receiving space, a carrier movable to and from a heel receiving position successively to conduct the heels from said space and deliver them to the attaching mechanism, and a guideway for delivering the heels to said space when the carrier is out of heel receiving position.

29. In a machine of the character described, a movable support having a heel receiving space, a carrier movable to and fro in said space, successively to remove the heels therefrom, a guideway in open communication with said space, connected to said support and movable therewith, said guideway being constructed to support a series of heels edge to edge and to deliver the heels to said space while the carrier is out of its heel receiving position.

30. In a machine of the character described, the combination of mechanism for driving nails into a heel, a carrier movable into operative relation with said nail driving mechanism, a breast gage and a back gage sustained by said carrier for gripping a blank, said back gage being movable in a direction substantially perpendicular to one surface of the blank.

31. In a machine of the character described, the combination of a carrier plate provided with a surface for engaging the tread face of a blank, a breast gage movable with relation to said carrier plate and a blank engaging member movable in a direction at an angle to the plane of said plate for engaging the rear edge of the blank.

32. In a machine of the character described, the combination of a carrier plate provided with a surface for engaging the tread face of a blank, a breast gage yieldingly movable with relation to said carrier plate and a blank engaging member movable in a direction at an angle to the plane of said carrier plate for engaging the rear edge of the blank, said engaging member being so formed as to permit a blank to move laterally with relation thereto whereby said blank may be seated squarely against the said breast gage.

33. In a heel attaching machine, a blank holder having positioning means comprising a breast gage and a separate back gage relatively movable to embrace the edges of the blank, said separate back gage having a main portion and an engaging portion mounted for movement relative to the main portion in a path of direction at substantial right angles to the plane of the tread face of the blank.

34. A work holder for boot and shoe machines comprising a breast gage and a back gage, means for moving said gages toward each other to clamp the work between them, means for supporting the breast gage unyieldingly with reference to movement in a direction transverse of the tread surface of the heel and means for supporting the back gage yieldingly with reference to movement in the same direction.

35. A heel attaching machine having, in combination, a reciprocatory cross-head, drivers carried thereby, a jack, a movable heel-engaging plate adapted to be held in alinement with and between said drivers and said jack, a lever pivoted to the frame of the machine and having a cam face, and another face disposed at an angle thereto, and means carried by said cross-head and acting on said cam face during the movement of the cross-head for swinging said lever to move said heel-engaging plate toward the jack, thereby subjecting a heel to pressure preliminarily to the operation of the drivers and thereafter acting upon the other face of said lever to lock said heel engaging-plate in position of pressure.

In testimony whereof, I have signed my name to this specification, in the presence of two subscribing witnesses.

CHARLES R. TOWLE.

Witnesses:
L. H. HARRIMAN,
H. B. DAVIS.